United States Patent [19]

Shiozaki

[11] Patent Number: 5,504,308
[45] Date of Patent: Apr. 2, 1996

[54] SYNTHETIC RESIN TUBE FOR BENDING USE AND ITS BENDING METHOD

[75] Inventor: Kotaro Shiozaki, Susono, Japan

[73] Assignee: Kabushikikaisha Fujipula Seiko, Shizuoka, Japan

[21] Appl. No.: 260,435

[22] Filed: Jun. 15, 1994

[51] Int. Cl.$^6$ ................ H05B 6/10; B29C 17/00
[52] U.S. Cl. .............. 219/634; 219/609; 219/618; 156/274.2; 285/41
[58] Field of Search .................. 219/633, 634, 219/618, 609; 156/379.6, 272.4, 274.2; 285/41

[56] References Cited

U.S. PATENT DOCUMENTS

| | | | |
|---|---|---|---|
| 2,739,829 | 3/1956 | Pedlow | 219/633 |
| 4,541,891 | 9/1985 | Leatherman | 219/633 |
| 5,053,595 | 10/1991 | Derbyshire | 219/634 |
| 5,126,521 | 6/1992 | McGaffigan | 219/634 |
| 5,208,443 | 5/1993 | McGaffigan | 219/634 |
| 5,338,920 | 8/1994 | Okusaka et al. | 219/633 |

FOREIGN PATENT DOCUMENTS

| | | | |
|---|---|---|---|
| 55-140417 | 10/1980 | Japan . | |
| 55-140416 | 10/1980 | Japan . | |
| 58-385 | 1/1983 | Japan | 219/633 |
| 63-249631 | 10/1988 | Japan . | |
| 1-69329 | 3/1989 | Japan . | |

Primary Examiner—Philip H. Leung
Attorney, Agent, or Firm—Lowe, Price, LeBlanc & Becker

[57] ABSTRACT

A bendable synthetic resin tube includes a tube member made from thermoplastic synthetic resin, and a high-frequency induction heat generating layer which includes a heat generating member chiefly containing a material capable of inductively generating heat when subjected to high-frequency wave and a binder made from a material having the same properties as that of the tube member. The high-frequency induction heat generating layer extends continuously or noncontinuously along an entire cylindrical surface of the tube member in a longitudinal direction of the tube member. To bend this synthetic resin tube, a high-frequency wave is first irradiated onto only a bending portion of the synthetic resin tube, so as to heat and soften the bending portion. Then, the softened synthetic resin tube is deformed at the bending portion using a bending die. The bending portion is cooled down immediately after finishing the bending deformation of the synthetic resin tube.

7 Claims, 7 Drawing Sheets

SYNTHETIC RESIN TUBE FOR BENDING USE AND ITS BENDING METHOD

BACKGROUND OF THE INVENTION

1. Field of the Invention

The present invention relates to a synthetic resin tube for bending use, which comprises a high-frequency induction heat generating member, and its bending method of performing a bending processing on this synthetic resin tube utilizing high-frequency induction heating.

2. Background of the Related Art

Today, heat set of tubes, made from thermoplastic synthetic resin and formed in various shapes, are used in a wide variety of fields.

For example, coil tubes, which are heat-set products of nylon and polyurethane tubes, are used as hose for industrial use, machine use or air tool use. Furthermore, tubes made through the two- or three-dimensional bending processing, are used as fuel pipe for an automotive vehicle or other pipes associated with various components in other industrial fields.

According to a conventional heat setting process for a thermoplastic resin tube, a pipe or tube is preheated or heated up to a desired temperature and then applied shaping processing, such as bending, under such a heated condition, followed by a cool-down processing by a cooling means, thereby manufacturing a desired heat-set product.

Heat surroundings were generally gas, fluid and solid (sand, dies or the like).

Figure 12A:
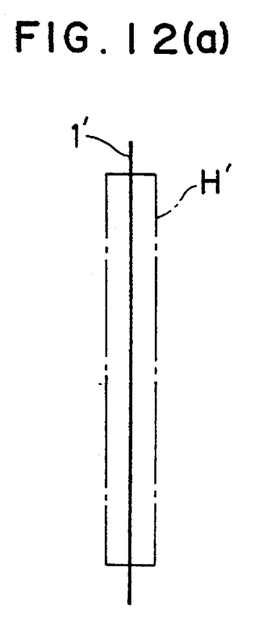
FIGS. 12(a), 12(b) and 12(c) are views illustrating the procedure of one conventional bending method.
Figure 12B:
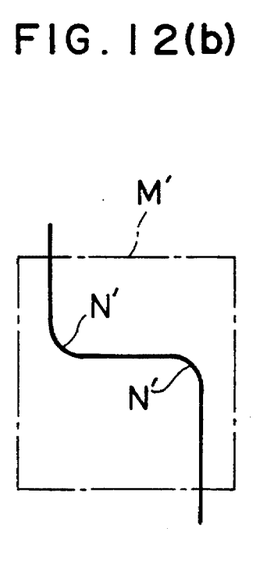
Figure 12C:
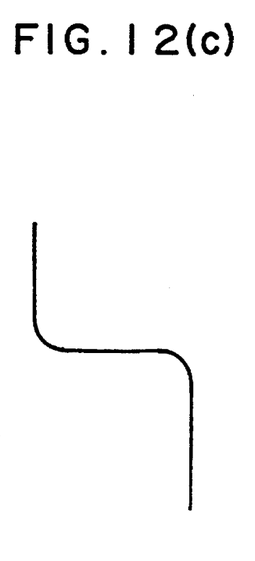

For example, in the fabrication of crank type tube, a pipe 1' is heated by a heating device H' as shown in FIG. 12(a), and thus heated pipe 1' is pushed or fitted into a die M' to form two bent portions N' and N' as shown in FIG. 12(b), and thereafter the pipe 1' is cooled down together with the die M', thus accomplishing a crank type pipe shown in FIG. 12(c).

As described above, the conventional heat-set product requires to heat not only the portion to be applied the two- or three-dimensional bending processing but the remaining portion other than such a bending portion before fitting into the molding die (sand, metal mold or the like). In particular, in the cooling down operation succeeding such a molding operation, the pipe united with the molding die as a whole needs to be cooled down, which results in deterioration of work effectiveness.

Unexamined Japanese Patent Application No. 69329/1989 discloses a method of bending a non-metallic tube, wherein a non-metallic tube to be bent, which contains granules having good electrical conductivity, is disposed near an induction coil which is actuated by supplying high-frequency current. Upon supply of high-frequency current to the induction coil, the granules in the non-metallic tube are inductively heated so that the temperature of the non-metallic tube reaches up to a predetermined temperature. Thereafter, bending processing is applied on thus heated non-metallic tube.

Furthermore, Unexamined Japanese Patent Application No. 249631/1988 discloses a method of manufacturing a fiber reinforced synthetic resin product. According to this method, light-weight reinforced fibers coated by thermoplastic resin are wound, together with metallic fibers, around a mandrel in layers utilizing the filament winding method, thus forming a fabricating material layer containing metallic fibers. Then, after the mandrel is removed, high-frequency induction heating is applied on the fabricating material layer to soften the thermoplastic resin, followed by deformation processing by which the fabricating material layer is bent and formed in a predetermined shape.

SUMMARY OF THE INVENTION

Accordingly, in view of above-described problems encountered in the prior art, a principal object of the present invention is to improve work efficiency by heating and cooling only the portions to be bent, without changing the properties of the synthetic resin tube and without requiring the heat surroundings which were used in the bending processing according to the conventional method.

In order to accomplish this and other related objects, one aspect of the present invention provides a synthetic resin tube comprising a tube member made from thermoplastic synthetic resin, and a high-frequency induction heat generating layer, which is a kneading material including a heat generating member chiefly containing a material generating heat when subjected to high-frequency wave and a binder made from a material having the same properties as that of the tube member or a material different from but affinitive with the tube member. The high-frequency induction heat generating layer extends continuously or noncontinuously along an entire cylindrical surface of the tube member in a longitudinal direction of the tube member.

Another aspect of the present invention provides a method of bending a bending-use synthetic resin tube provided with the high-frequency induction heat generating layer, comprising steps of irradiating high-frequency wave onto only a bending portion of the synthetic resin tube, so as to heat and soften the bending portion, deforming the softened synthetic resin tube at the bending portion using a bending die, and cooling down the bending portion immediately after finishing the deforming step.

The high-frequency induction heat generating layer is provided closely at any point of synthetic resin tube. Therefore, by irradiating high-frequency wave onto a desired portion of the synthetic resin rube, the high-frequency induction heat generating layer is inductively heated at this irradiated portion and thus the tube member is softened at this irradiated portion. Then the softened synthetic resin tube is deformed using a bending die. Subsequently, only the heated portion is cooled down to freeze.

BRIEF DESCRIPTION OF THE DRAWINGS

FIGS. 1(a) and 1(b) are cross-sectional views showing an essential part of a synthetic resin tube in accordance with a first embodiment of the present invention, wherein

FIGS. 3(a) and 3(b) are cross-sectional views showing an essential part of a synthetic resin tube in accordance with a second embodiment of the present invention, wherein

FIGS. 4(a) and 4(b) are cross-sectional views showing an essential part of a synthetic resin tube in accordance with a third embodiment of the present invention, wherein

FIGS. 6(a) and 6(b) are views showing a heating device in accordance with the present invention, wherein

DETAILED DESCRIPTION OF THE PREFERRED EMBODIMENTS

Figure 1A:
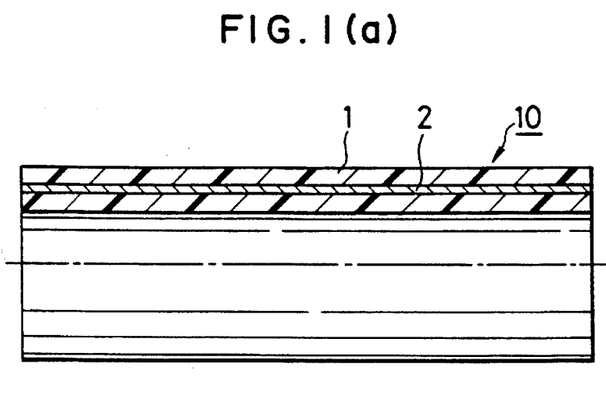
FIG. 1(a) is a longitudinal cross-sectional view of a half part of this first embodiment synthetic resin tube and FIG. 1(b) is a lateral cross-sectional view of the same.
Figure 1B:
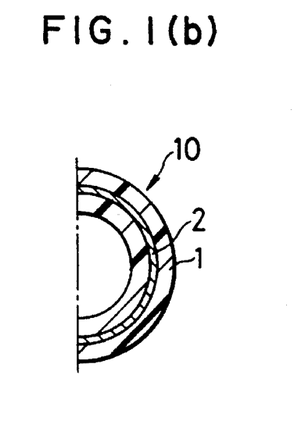

As illustrated in FIG. 1, a bending-use synthetic resin tube 10 consists of a tube member 1 made from thermoplastic synthetic resin and a high-frequency induction heat generating layer 2 integrally disposed in the tube member 1 so as to extend continuously and wholly in the longitudinal direction of the tube member 1.

Figure 2:
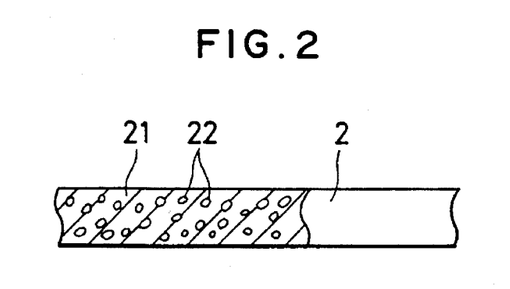
FIG. 2 is a cross-sectional view showing an essential part of a heat generating layer.

The high-frequency induction heat generating layer 2, as illustrated in FIG. 2, is formed by kneading material including a binder 21, which is made from a material having the same properties as the fabricating material of the tube member 1 or a material different from but affinitive with the fabricating material of the tube member 1, and granules 22 chiefly containing material which generates heat inductively when subjected to high-frequency wave.

The high-frequency induction heat generating layer 2 is disposed at the center of the tube member 1 in the direction of thickness, and is a complete cylindrical body extending along the entire surface of the tube member 1 and integrally formed with the tube member 1.

The high-frequency induction heat generating layer 2 becomes easier to heat with increasing particle size of the granules 22. For example, in the case of iron granules, particle size of at least 10 micron or more will be preferable. There is no need that the granules 22 are limited to iron material only; therefore any other high-frequency induction heating material can be used.

Furthermore, the binder 21 is made from the material substantially identical with that of the tube member 1 or different from but affinitive with the tube member 1; therefore, the thickness of the high-frequency induction heat generating layer 2 can be determined to be a proper value by taking account of the thickness, diameter and others of the tube member 1.

Figure 3A:
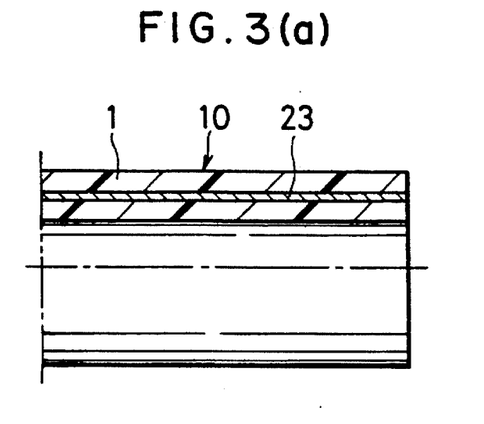
FIG. 3(a) is a longitudinal cross-sectional view of a half part of this second embodiment synthetic resin tube and FIG. 3(b) is a lateral cross-sectional view of the same.
Figure 3B:
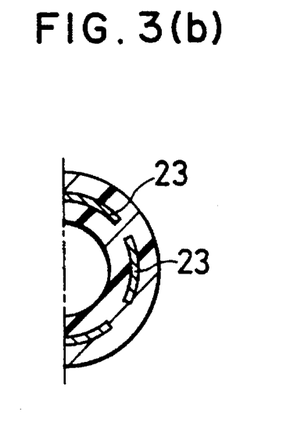

The bending-use synthetic resin tube 10 is not limited to the above-described embodiment. As illustrated in FIGS. 3(a) and 3(b), the high-frequency induction heat generating layer 2 can be formed as belt-like member 23, 23 disposed at the center of the tube member 1 in the thickness direction so as to extend continuously in the longitudinal direction of the tube member 1 but being divided into a plurality of arc fragments disposed at adequate intervals in the circumferential direction of the tube member 1.

Figure 4A:
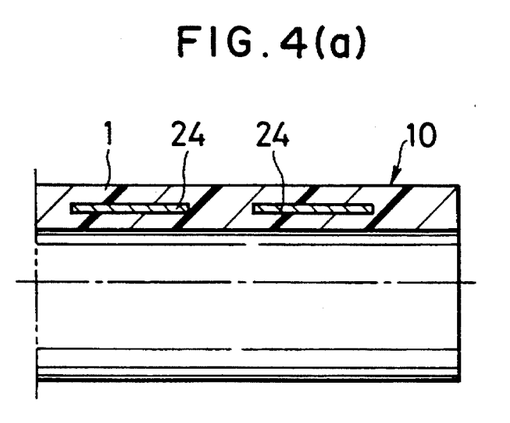
FIG. 4(a) is a longitudinal cross-sectional view of a half part of this third embodiment synthetic resin tube and FIG. 4(b) is a lateral cross-sectional view of the same.
Figure 4B:
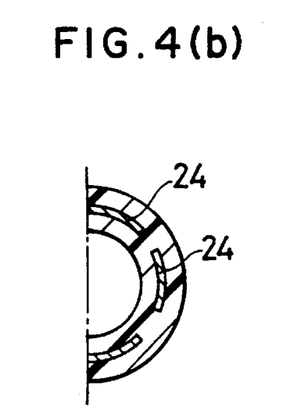

Furthermore, as illustrated in FIGS. 4(a) and 4(b), the high-frequency induction heat generating layer 2 can be disposed at the center of the tube member 1 in the thickness direction so as to be noncontinuous and divided into a plurality of small pieces 24, - - - , 24 at adequate intervals in both the longitudinal and the circumferential directions of the tube member 1. Still further, the high-frequency induction heat generating layer 2 can be formed or disposed on the outer cylindrical surface or the inner cylindrical surface of the tube member 1 instead of inside thereof. If the tube member 1 is too thick, the high-frequency induction heat generating layer 2 can be constituted in a two-layer structure.

The synthetic resin tube 10 is bent in the following manner.

Figure 5A:
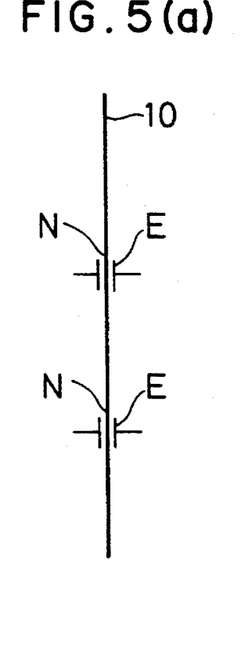
FIGS. 5(a), 5(b) and 5(c) are views illustrating the procedure of bending method in accordance with the present invention.

First, as illustrated in FIG. 5(a), high-frequency generating devices E, E are placed by the synthetic resin tube 10 so as to face with the bending portions N, N to be bent. The high-frequency generating devices E, E irradiate high-frequency wave onto the bending portions N, N only, thus increasing the temperature of the high-frequency induction heat generating layer 2 provided in the area of the bending portions N, N. As a result, the tube member 1 is softened at the bending portions N, N only.

Figure 5B:
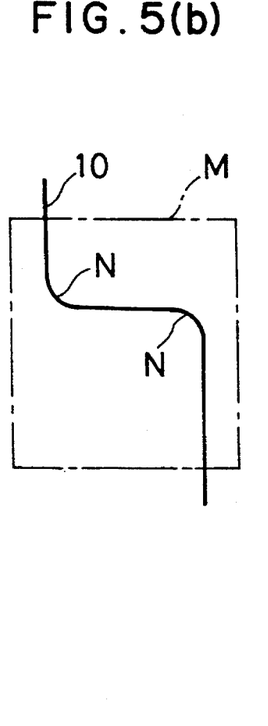
Figure 5C:
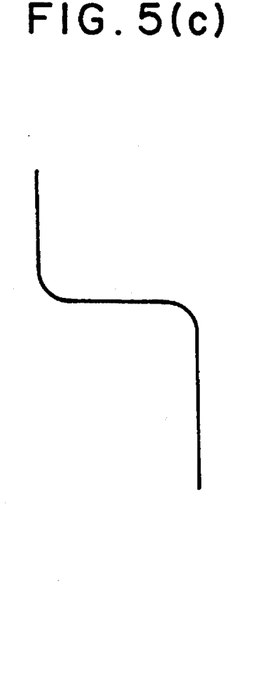

Next, as illustrated in FIG. 5(b), the softened bending portions N, N are pushed or fitted into the die M and deformed into the crank shape. Thereafter, the tube member 1 is cooled down at the bending portions N, N only, thereby forming a crank type pipe shown in FIG. 5(c).

Figure 6A:
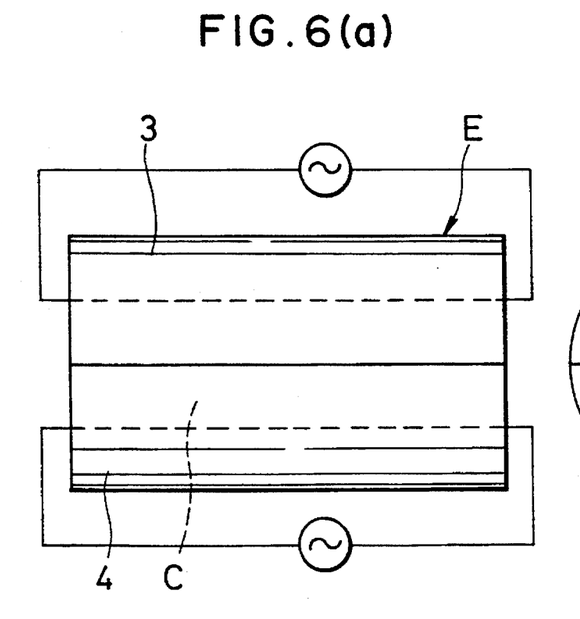
FIG. 6(a) is a front view and FIG. 6(b) us a side view of this heating device.
Figure 6B:
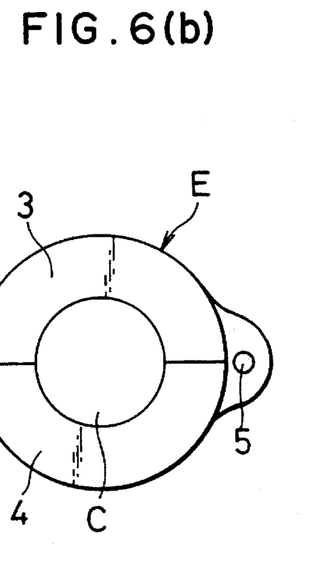

FIGS. 6(a) and 6(b) illustrate the details of high-frequency generating device E which is used for bending the synthetic resin tube 10.

This high-frequency generating device E comprises an upper die 3 and a lower die 4 which are cooperatively opened and closed in the up-and-down direction. These upper and lower dies 3 and 4 are joined by a hinge portion 5. Each of these upper and lower dies 3 and 4 is independently equipped with a high-frequency generating means. Furthermore, these upper and lower dies 3 and 4 cooperatively form a desired cylindrical void space C inside thereof.

The high-frequency generating means adopted in each of the upper and lower dies 3 and 4 is a conventional high-frequency generating means having a high-frequency power source and a magnetic field generating coil.

The method of bending the synthetic resin tube 10 will be explained below in more detail.

Figure 7:
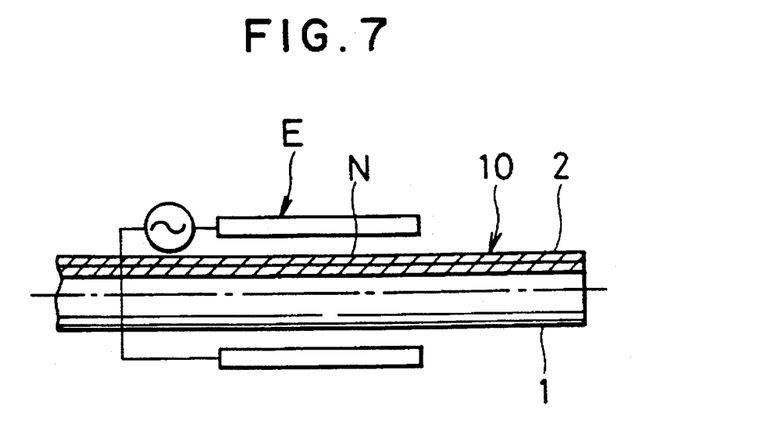
FIG. 7 is a cross-sectional view illustrating a first step of the bending method in accordance with the present invention.

In a first step, as illustrated in FIG. 7, the bending-use synthetic resin tube 10 is inserted into the void space C so that the bending portion N is placed in front of the high-frequency generating device E. The tube member 1 is then softened at this bending portion N as the high-frequency induction heat generating layer 2 generates heat at this bending portion N.

Figure 8:
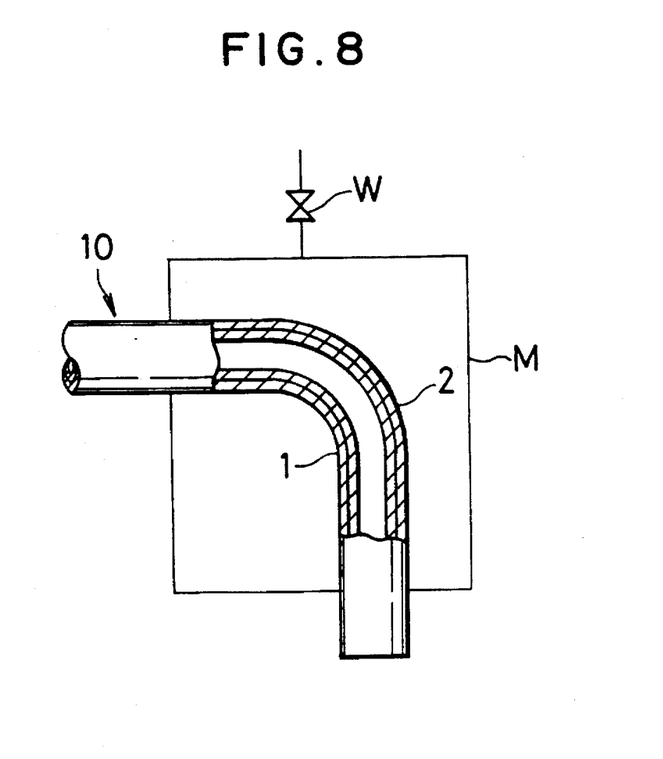
FIG. 8 is a cross-sectional view illustrating second and third steps of the bending method in accordance with the present invention.

In a second step, as illustrated in FIG. 8, the softened synthetic resin tube 10 is pushed or fitted into the bending-use die M which has a bending shape thereon, thus deforming the synthetic resin tube 10 into an L-shaped pipe. After finishing the above-described L-shape formation, this die M is cooled down, as a third step, by a cooling device W, thereby freezing the L-shaped tube 10.

Figure 9:
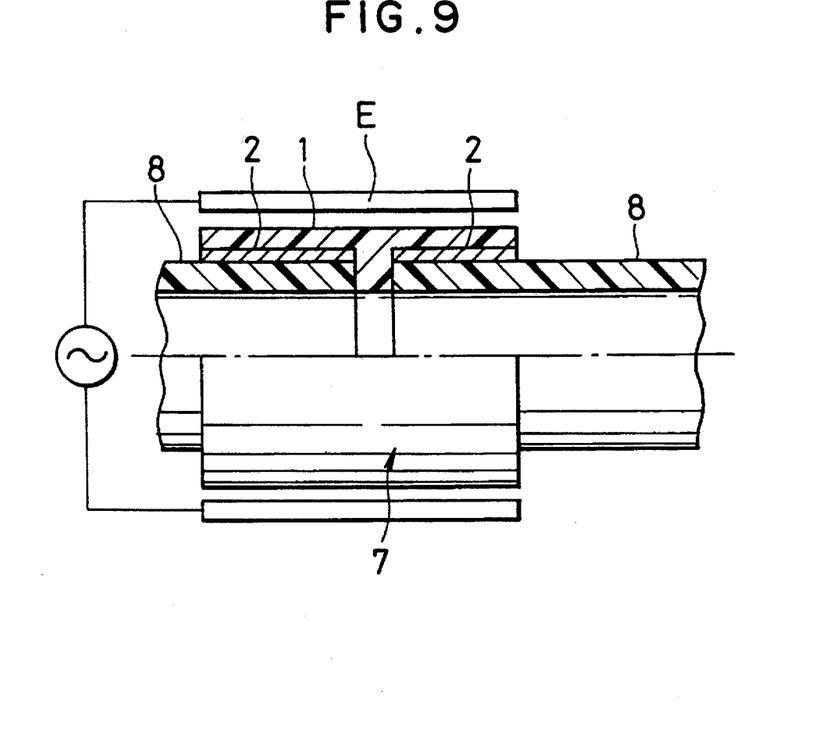
FIG. 9 is a cross-sectional view illustrating a first step of the bending method applied to synthetic resin connecting tubes associated with a fitting.

In the case of synthetic resin connecting tubes associated with a fitting 7, as illustrated in FIG. 9, the high-frequency induction heat generating layer 2 is provided on the inner surface of the tube member 1. This tube member 1 and the high-frequency induction heat generating layer 2 have the same construction as those of the bending-use synthetic resin tube 10 having been already explained in the foregoing description.

In using this fitting 7 for connecting two synthetic resin tubes 8, 8 made from material having the same properties as that of the tube member 1, the connecting edges of synthetic resin tubes 8 and 8 are inserted into the fitting 7 from opposite ends thereof. The high-frequency generating device E is disposed around and slightly spaced from the outer surface of the fitting 7, and is then operated. When received high frequency wave from the high-frequency generating device E, the high-frequency induction heat generating layer 2 of the fitting 7 generates heat. By this heat generation, connecting portions are melted, thereby welding the fitting 7 and the synthetic resin tubes 8, 8.

Figure 10:
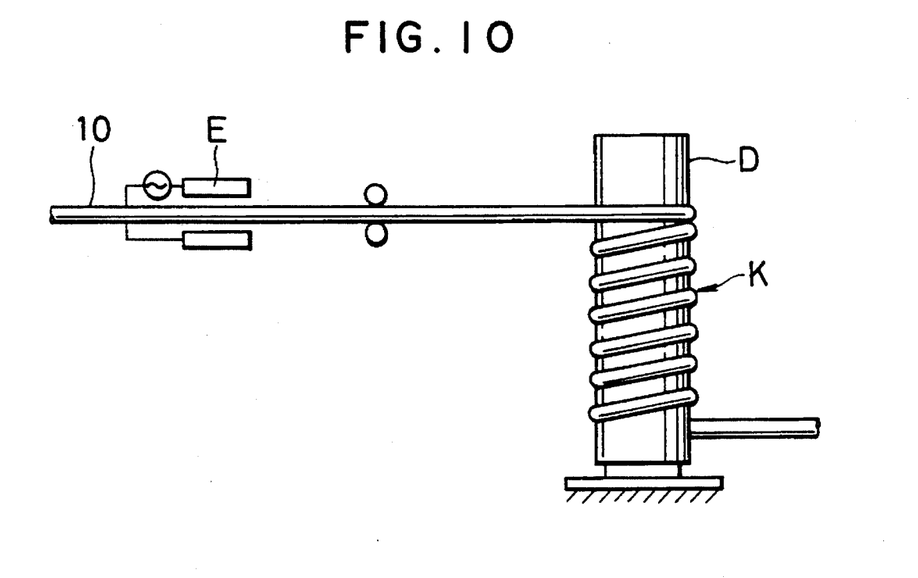
FIG. 10 is a front view illustrating first and second steps of the bending method applied to a synthetic resin tube formed into a coil ring tube.

In a case that the bending-use synthetic resin tube 10 is formed into a coil ring tube, as illustrated in FIG. 10, the synthetic resin tube 10 continuously passes through the high-frequency generating device E and is therefore heated and softened and subsequently wound in a coil shape on the surface of a winding drum D serving as a processing die in accordance with rotation of this winding drum D. After that, the coil-shaped synthetic resin tube 10 is quickly cooled down to obtain a coil ring tube K.

By combining these methods, a two- or three-dimensionally bent tube can be obtained.

Figure 11:
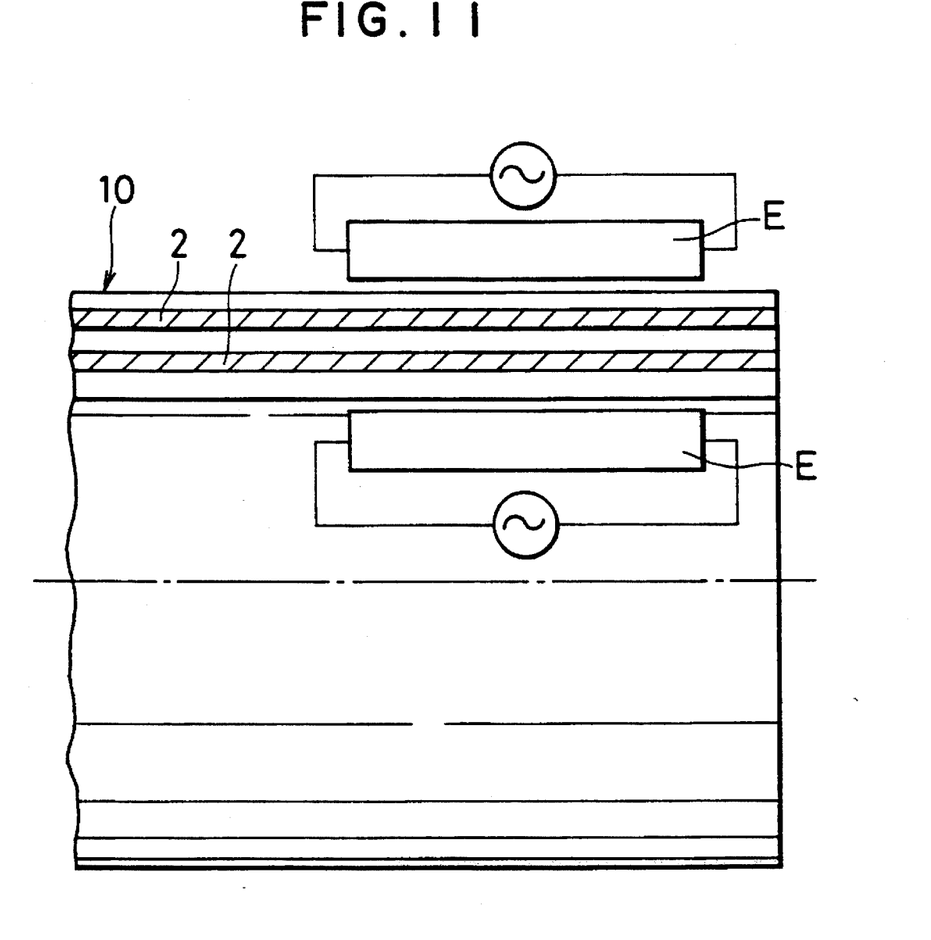
FIG. 11 is a cross-sectional view illustrating a first step of the bending method applied to a synthetic resin tube having a larger diameter and a larger thick.

In the case of the tube member 1 has a larger thickness and a larger diameter, as illustrated in FIG. 11, two layers 2, 2 (heat generating members) of high-frequency induction heat generating layer are disposed inside the tube member along the cylindrical wall thereof. A pair of high-frequency generating devices E, E is provided inside and outside the bending-use synthetic resin tube 10, and is operated so that temperatures of two layers 2, 2 of high-frequency induction heat generating layers are simultaneously increased. Thus, the tube member 1 is softened, within a short time, at the portion corresponding to the high-frequency generating devices E, E, thus performing a bending processing.

A flare processing applied on the front edge of synthetic resin tube or a bulge processing for forming a ridge at an intermediate portion of a synthetic resin tube can be appropriately executed using a high-frequency generating device and jig, such as bending-use dies, which have size and shape suitable for the purpose of each processing.

As described in the foregoing description, the present invention requires to heat the predetermined bending portion only of the synthetic resin tube by irradiating high-frequency wave thereon, deform the softened bending portion, and cool down thus deformed bending portion only. Accordingly, an overall processing time is very short and, therefore, manufacturing efficiency can be greatly increased.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A bending-use synthetic resin tube comprising:

a tube member made from thermoplastic synthetic resin; and a high-frequency induction heat generating layer, integrally formed with the tube member and comprising a material capable of inductively generating heat when subjected to a high-frequency wave and a binder made from a material having the same properties as said tube member, said high-frequency induction heat generating layer extending continuously along an entire cylindrical surface of said tube member in a longitudinal direction of said tube member, wherein said high-frequency induction heat generating layer is disposed centrally of a thickness of said tube member.

2. The bending-use synthetic resin tube according to claim 1, wherein:

said high-frequency induction heat generating layer comprises a plurality of layers.

3. A bending-use synthetic resin tube, comprising:

a tube member made from thermoplastic synthetic resin; and a high-frequency induction heat generating layer, integrally formed with the tube member and comprising a material capable of inductively generating heat when subjected to high-frequency wave and a binder made from a material having the same properties as said tube member, said high-frequency induction heat generating layer extending continuously along an entire cylindrical surface of said tube member in a longitudinal direction of said tube member, wherein said high-frequency induction heat generating layer is divided into a plurality of belt-line fragments disposed at selected intervals in a circumferential direction of said tube member, and wherein each belt-line fragment extends entirely in the longitudinal direction of said tube member.

4. A bending-use synthetic resin tube, comprising:

a tube member made from thermoplastic synthetic resin; and a high-frequency induction heat generating layer, integrally formed with the tube member and comprising a material capable of inductively generating heat when subjected to high-frequency wave and a binder made from a material having the same properties as said tube member, said high-frequency induction heat generating layer extending continuously along an entire cylindrical surface of said tube member in a longitudinal direction of said tube member, wherein said high-frequency induction heat generating layer is noncontinuous and is divided into a plurality of small pieces which are located at selected intervals apart in both longitudinal and circumferential directions of said tube member.

5. A method of bending a synthetic resin tube comprising a tube member made from thermoplastic synthetic resin, and a high-frequency induction heat generating layer integral with the tube member and comprising a kneading material including a heat generating member chiefly containing a material capable of inductively generating heat when subjected to high-frequency wave and a binder made from a material having the same properties as said tube member, said high-frequency induction heat generating layer extending continuously along an entire cylindrical surface of said tube member in a longitudinal direction of said tube member, said method comprising the steps of:

irradiating a high-frequency wave onto only a bending portion of said synthetic resin tube, so as to heat and soften said bending portion;

using a bending die to deform said softened synthetic resin tube at said bending portion; and cooling said bending portion immediately after said deforming step.

6. A bendable element, comprising:

a tube member comprising a thermoplastic synthetic resin; and a high-frequency induction heat generating layer, containing a first material for inductively generating heat when subjected to high-frequency wave and a binder made from a second material having the same properties as that of said tube member, said high-frequency induction heat generating layer being integral with and disposed in a longitudinal direction of said tube member, wherein the high-frequency induction heat generating layer is disposed in a discontinuous manner in a circumferential direction of said tube member.

7. A bendable element, comprising:

a tube member comprising a thermoplastic synthetic resin; and a high-frequency induction heat generating layer, containing a first material for inductively generating heat when subjected to high-frequency wave and a binder made from a second material having the same properties as that of said tube member, said high-frequency induction heat generating layer being integral with and disposed in a longitudinal direction of said tube member, wherein, the high-frequency induction heat generating layer is disposed within a thickness of said tube member, and wherein said high-frequency induction heat generating layer is disposed centrally of a thickness of said tube member.

* * * * *